United States Patent
Ozawa

(10) Patent No.: US 9,088,754 B2
(45) Date of Patent: Jul. 21, 2015

(54) IMAGE PROCESSING DEVICE DETERMINING CHARACTERISTIC QUANTITY RELATING TO NUMBER OF COLORS

(71) Applicant: Ryohei Ozawa, Nogoya (JP)

(72) Inventor: Ryohei Ozawa, Nogoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/178,371

(22) Filed: Feb. 12, 2014

(65) Prior Publication Data

US 2014/0293299 A1  Oct. 2, 2014

(30) Foreign Application Priority Data

Mar. 29, 2013  (JP) .................. 2013-073133

(51) Int. Cl.
*H04N 1/40* (2006.01)
*H04N 1/64* (2006.01)
*H04N 1/60* (2006.01)

(52) U.S. Cl.
CPC .......... *H04N 1/642* (2013.01); *H04N 1/40062* (2013.01); *H04N 1/60* (2013.01)

(58) Field of Classification Search
CPC ......... G06K 9/4652; G06K 9/34; G06K 9/03; G06K 9/6203; H04N 13/0271; H04N 13/0022; H04N 5/272; H04N 1/40062; H04N 5/44591; H04N 13/0257

USPC .......... 358/462–464, 2.1, 500, 504, 515, 517, 358/527; 382/162, 166, 168–171, 176, 232
See application file for complete search history.

(56) References Cited

U.S. PATENT DOCUMENTS

| | | | | |
|---|---|---|---|---|
| 5,778,092 A * | 7/1998 | MacLeod et al. | ............. | 382/176 |
| 8,280,160 B2 * | 10/2012 | Matsuoka | ..................... | 382/166 |
| 8,351,694 B2 * | 1/2013 | Malvar et al. | ................. | 382/166 |
| 8,792,719 B2 * | 7/2014 | Ozawa et al. | ................. | 382/173 |
| 8,837,836 B2 * | 9/2014 | Kondo et al. | ................. | 382/195 |

FOREIGN PATENT DOCUMENTS

JP  2004-242075 A  8/2004

* cited by examiner

*Primary Examiner* — Thomas D Lee
*Assistant Examiner* — Stephen M Brinich
(74) *Attorney, Agent, or Firm* — Banner & Witcoff, Ltd.

(57) ABSTRACT

An image processing device identifies first pixels representing an object and second pixels representing a background in a target image; sets, in the target image, a target range of pixels in which at least one first pixel and at least one second pixel are included; changes, to a second pixel, a first pixel that is included in the target range and is adjacent to the second pixel, thereby classifying the plurality of first pixels into at least one changed first pixel and remaining first pixels, the changed first pixel being a first pixel that has been changed to a second pixel, the remaining first pixel being a first pixel that has been unchanged; and determines a characteristic quantity by using pixel values of the remaining first pixels, the characteristic quantity relating to a number of colors in the object.

9 Claims, 10 Drawing Sheets

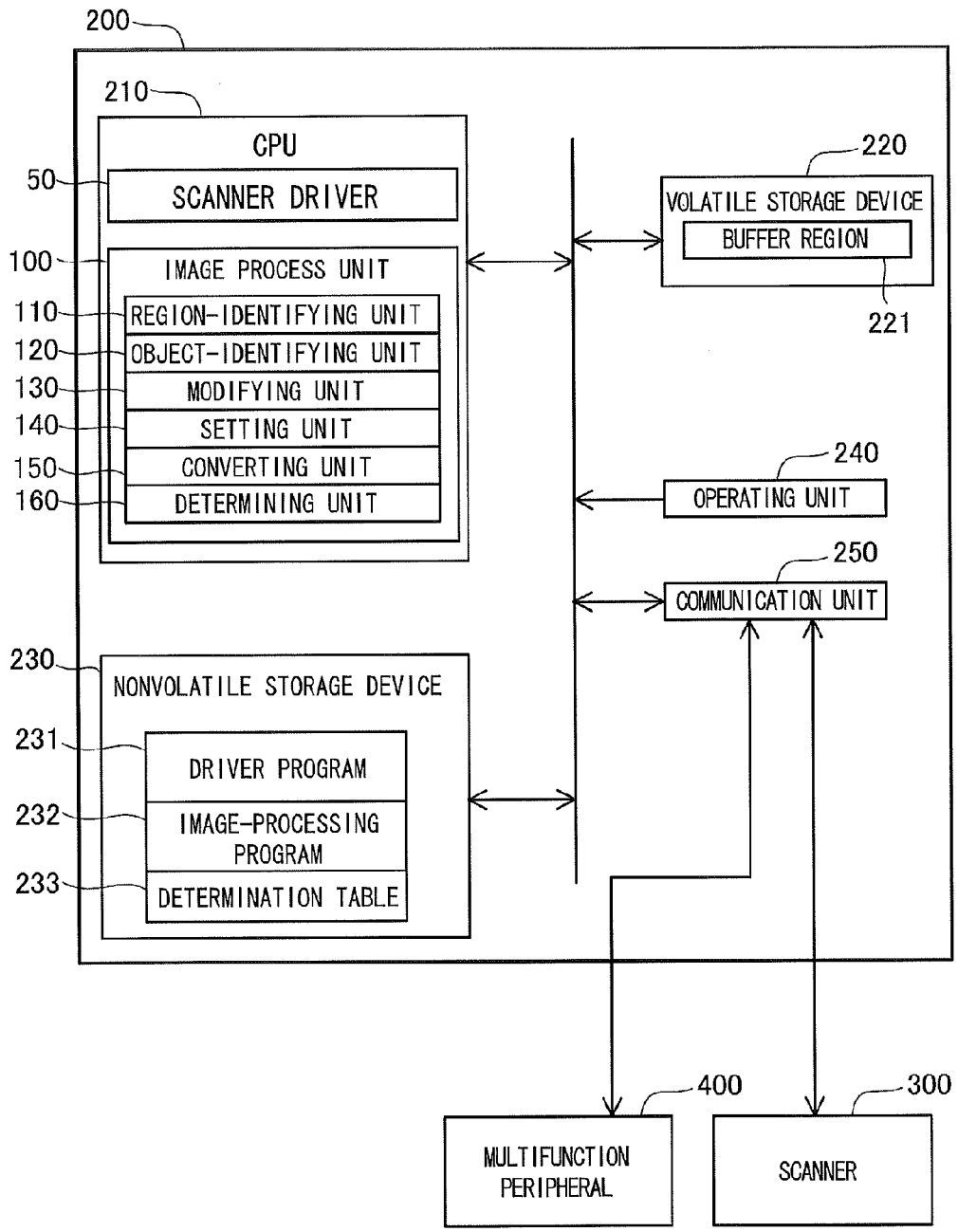

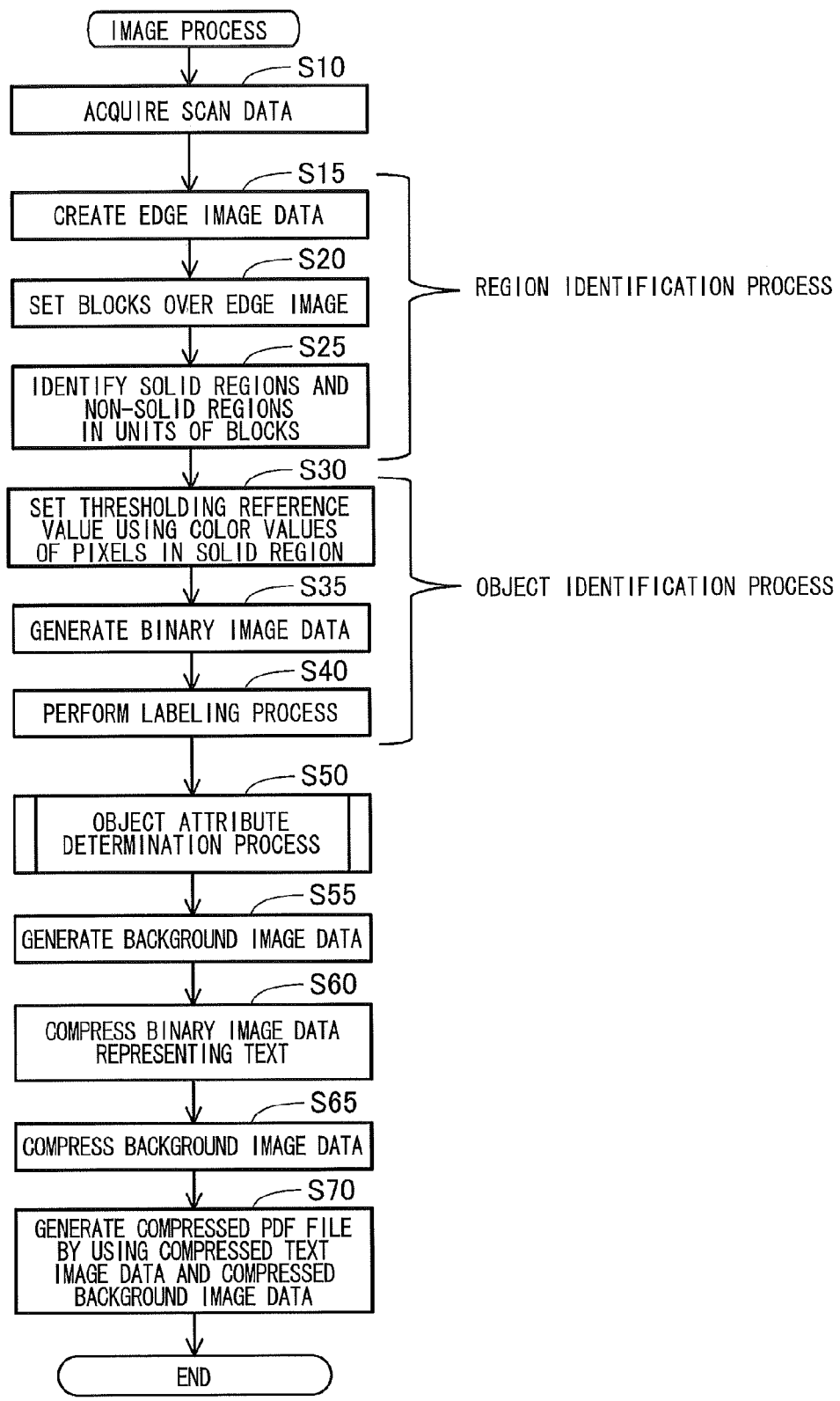

$$Se(x,y) = \left| \begin{bmatrix} -1 & 0 & 1 \\ -2 & 0 & 2 \\ -1 & 0 & 1 \end{bmatrix} \begin{bmatrix} P(x-1,y-1) & P(x,y-1) & P(x+1,y-1) \\ P(x-1,y) & P(x,y) & P(x+1,y) \\ P(x-1,y+1) & P(x,y+1) & P(x+1,y+1) \end{bmatrix} \right|$$
$$+ \left| \begin{bmatrix} -1 & -2 & -1 \\ 0 & 0 & 0 \\ 1 & 2 & 1 \end{bmatrix} \begin{bmatrix} P(x-1,y-1) & P(x,y-1) & P(x+1,y-1) \\ P(x-1,y) & P(x,y) & P(x+1,y) \\ P(x-1,y+1) & P(x,y+1) & P(x+1,y+1) \end{bmatrix} \right|$$

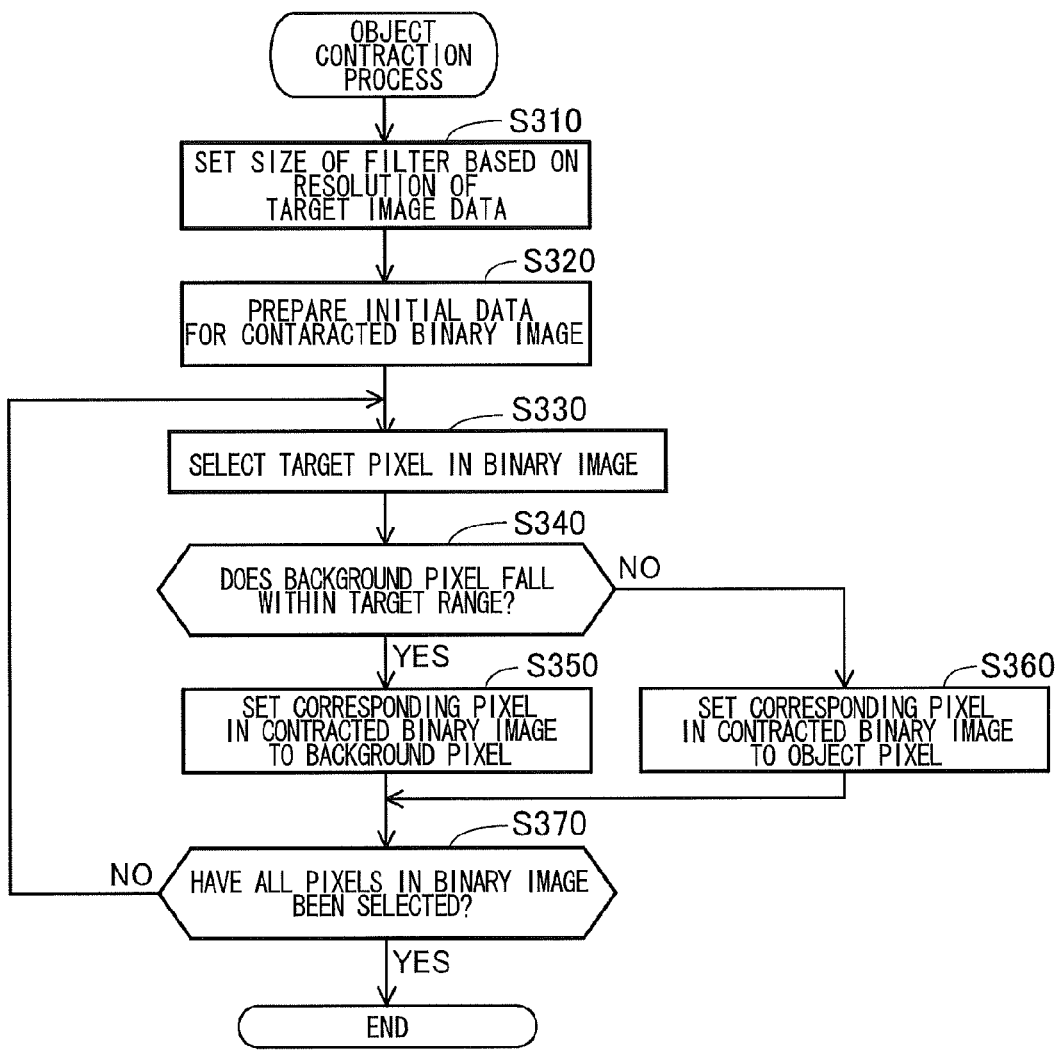

SIZE OF FILTER: FW = 2N + 1

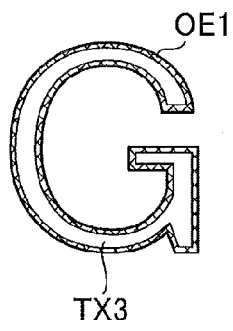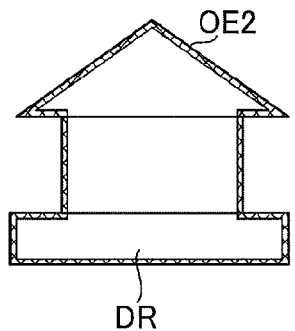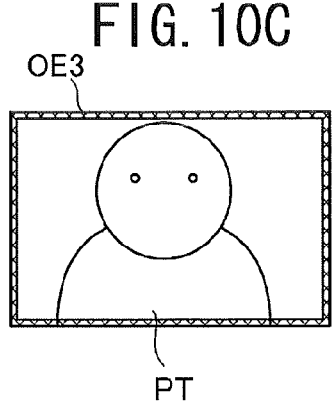
FIG. 10A  FIG. 10B  FIG. 10C
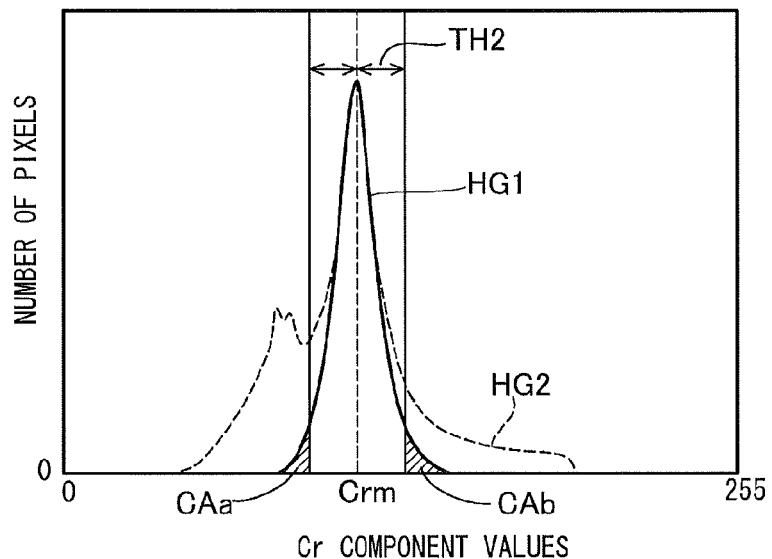
FIG. 11
C_cr = (PNa+PNb) / PNtotal
PNa: NUMBER OF PIXELS IN REGION CAa
PNb: NUMBER OF PIXELS IN REGION CAb
PNtotal: SUM OF NUMBER OF PIXELS

FIG. 12

| DISTRIBUTION WIDTH W | NUMBER OF COLOR C | PIXEL DENSITY S | OBJECT TYPE |
|---|---|---|---|
| GREATER THAN OR EQUAL TO Wth | GREATER THAN OR EQUAL TO Cth | GREATER THAN OR EQUAL TO Sth | NON-TEXT |
| | | SMALLER THAN Sth | NON-TEXT |
| | SMALLER THAN Cth | GREATER THAN OR EQUAL TO Sth | NON-TEXT |
| | | SMALLER THAN Sth | TEXT |
| SMALLER THAN Wth | GREATER THAN OR EQUAL TO Cth | GREATER THAN OR EQUAL TO Sth | NON-TEXT |
| | | SMALLER THAN Sth | NON-TEXT |
| | SMALLER THAN Cth | GREATER THAN OR EQUAL TO Sth | NON-TEXT |
| | | SMALLER THAN Sth | TEXT |

IMAGE PROCESSING DEVICE DETERMINING CHARACTERISTIC QUANTITY RELATING TO NUMBER OF COLORS

CROSS REFERENCE TO RELATED APPLICATION

This application claims priority from Japanese Patent Application No. 2013-073133 filed Mar. 29, 2013. The entire content of the priority application is incorporated herein by reference.

TECHNICAL FIELD

The present invention relates to an image processing device.

BACKGROUND

Technologies have been developed for analyzing image data in order to determine the attributes of objects within the image. For example, Japanese unexamined patent application publication No. 2004-242075 describes an image-processing method that applies a thinning process to characters detected in an image and that determines whether a character is monochromatic based on the color of the thinned character.

SUMMARY

However, this image-processing method does not provide any description of thinning objects other than characters. Hence, the conventional technology described above may not be able to determine appropriately the number of colors in objects other than characters or objects that cannot be clearly identified as characters.

In view of the foregoing, it is an object of the present invention to provide a new image-processing method capable of determining the number of colors in objects, regardless of the object type.

In order to attain the above and other objects, the invention provides an image processing device including a processor configured to: identify a plurality of first pixels and a plurality of second pixels included in a target image represented by target image data, the plurality of first pixels representing an object, the plurality of second pixels representing a background; set, in the target image, a target range of pixels in which at least one first pixel and at least one second pixel are included; change, to a second pixel, a first pixel that is included in the target range and is adjacent to the second pixel, thereby classifying the plurality of first pixels into at least one changed first pixel and remaining first pixels, the changed first pixel being a first pixel that has been changed to a second pixel, the remaining first pixel being a first pixel that has been unchanged; and determine a characteristic quantity by using pixel values of the remaining first pixels, the characteristic quantity relating to a number of colors in the object.

According to another aspect, the present invention provides a non-transitory computer readable storage medium storing a set of program instructions executed by a computer, the program instructions including: identifying a plurality of first pixels and a plurality of second pixels included in a target image represented by target image data, the plurality of first pixels representing an object, the plurality of second pixels representing a background; setting, in the target image, a target range of pixels in which at least one first pixel and at least one second pixel are included; changing, to a second pixel, a first pixel that is included in the target range and is adjacent to the second pixel, thereby classifying the plurality of first pixels into at least one changed first pixel and remaining first pixels, the changed first pixel being a first pixel that has been changed to a second pixel, the remaining first pixel being a first pixel that has been unchanged; and determining a characteristic quantity by using pixel values of the remaining first pixels, the characteristic quantity relating to a number of colors in the object.

BRIEF DESCRIPTION OF THE DRAWINGS

The particular features and advantages of the invention as well as other objects will become apparent from the following description taken in connection with the accompanying drawings, in which:

FIG. 1 is a block diagram showing the structure of an image processing device according to an embodiment of the present invention;

FIG. 2 is a flowchart illustrating steps in an image process executed by the image processing device;

FIG. 8 is a flowchart illustrating steps in an object contraction process;

FIGS. 10A-10C are explanatory diagrams showing contracted binary images;

FIG. 11 shows an example of histogram of Cr values;

FIG. 12 shows an example of a determination table; and

DETAILED DESCRIPTION

A. Embodiment

A-1: Structure of a Computer

Figure 3C:
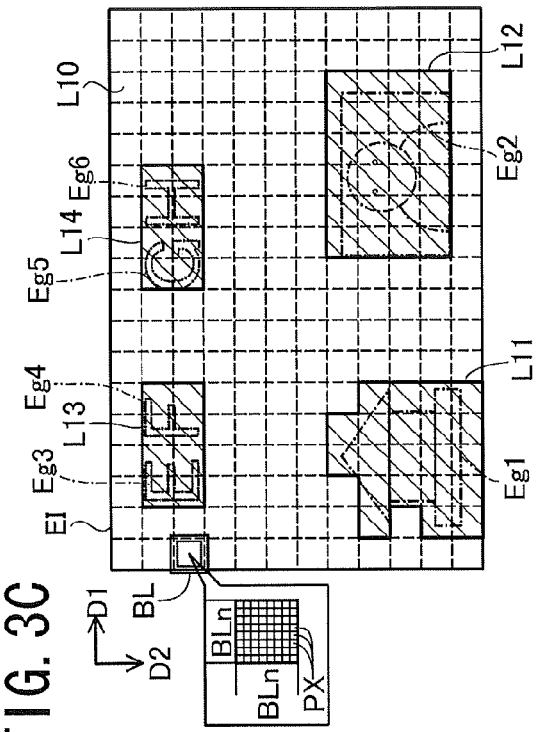
FIG. 3C shows a binary image corresponding to the target image of FIG. 3A.

Next, an embodiment of the present invention will be described while referring to the accompanying drawings. FIG. 1 is a block diagram showing the structure of a computer 200 according to the embodiment. The computer 200 may be a personal computer, for example, and includes a CPU 210; a volatile storage device 220 configured of DRAM (dynamic random access memory) or the like; a nonvolatile storage device 230 configured of flash memory, a hard disk drive, or the like; an operating unit 240 configured of a touchscreen, keyboard, and the like; and a communication unit 250 providing an interface for the computer 200 to communicate with external devices.

The computer 200 is connected to and capable of communicating with external devices, such as a scanner 300 and a multifunction peripheral 400 shown in FIG. 1, via the communication unit 250. The scanner 300 is an image-reading device that acquires scan data by optically reading a target object, such as an original document. The multifunction peripheral 400 includes an image-reading unit for acquiring scan data by optically reading the target object. The image-reading unit is not shown in FIG. 1.

The volatile storage device 220 is provided with a buffer region 221 for temporarily storing various intermediate data generated when the CPU 210 performs processes. The non-volatile storage device 230 stores a driver program 231, an image-processing program 232 for implementing an image process, and a determination table 233 referenced in the image process. These programs and the table may be provided on a CD-ROM (compact disc read only memory), DVD-ROM (digital versatile disc read only memory), or the like as a single integrated program or a plurality of separate programs. Alternatively, the programs and table may be made available to be downloaded from a server connected to the computer 200 through a network.

By executing the driver program 231, the CPU 210 functions as a scanner driver 50. The scanner driver 50 controls the scanner 300 or the image-reading unit in the multifunction peripheral 400 to generate scan data. By executing the image-processing program 232, the CPU 210 functions as an image process unit 100. The image process unit 100 executes an image process described later on target image data (scan data, for example) for generating a compressed PDF file. The image process unit 100 includes a region-identifying unit 110, an object-identifying unit 120, a modifying unit 130, a setting unit 140, a converting unit 150, and a determining unit 160.

The region-identifying unit 110 analyzes the target image data and identifies object regions and peripheral regions therein. More specifically, the region-identifying unit 110 identifies non-solid regions representing object regions, and solid regions representing peripheral regions positioned around the object regions. The object-identifying unit 120 identifies objects within object regions of the target image. As will be described later in greater detail, the object-identifying unit 120 identifies a plurality of object pixels constituting (representing) an object in the object region, and a plurality of background pixels. The modifying unit 130 executes a process to change some of the object pixels to background pixels. The setting unit 140 sets a characteristic quantity for the number of colors in an object using color values for the plurality of object pixels, excluding object pixels being changed to background pixels. The converting unit 150 converts the color values of pixels to values defined by a pre-scribed color space. For example, the converting unit 150 may convert RGB values representing pixels in the RGB color space to YCbCr values that include a first component value specifying brightness, and second component values specifying color (equivalent to tint defined by saturation and hue). The determining unit 160 uses the characteristic quantity relating to the number of colors to determine whether an object is text. The processes executed by these functional units will be described next in greater detail.

A-2: Image Process

FIG. 2 is a flowchart illustrating steps in the image process. The CPU 210 of the computer 200 executes this image process when the scanner driver 50 receives a read command from the user. The user issues a read command after setting an original in the scanner 300 or multifunction peripheral 400 as the object to be read.

In S10 of FIG. 2, the scanner driver 50 (see FIG. 1) acquires scan data through the communication unit 250 as the target image data and stores this scan data in the buffer region 221. More specifically, the scanner driver 50 controls the scanner 300 or the image-reading unit of the multifunction peripheral 400 to generate scan data and acquires this scan data from the same. The scan data is bitmap data representing the colors of a plurality of pixels in RGB values.

Figure 3A:
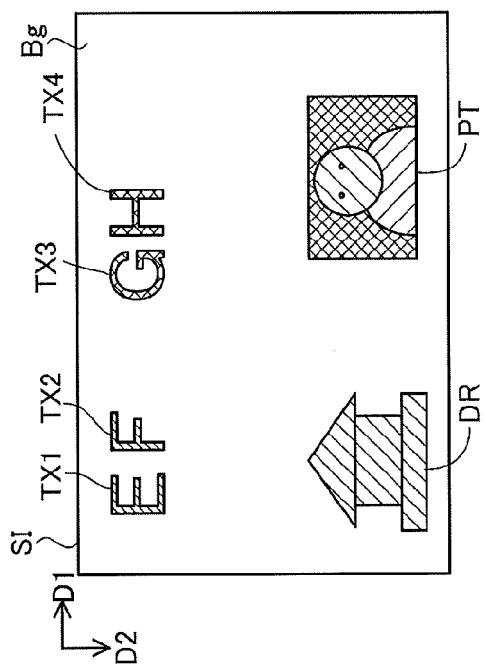
FIG. 3A shows an example of a target image rendered by target image data.
Figure 3B:
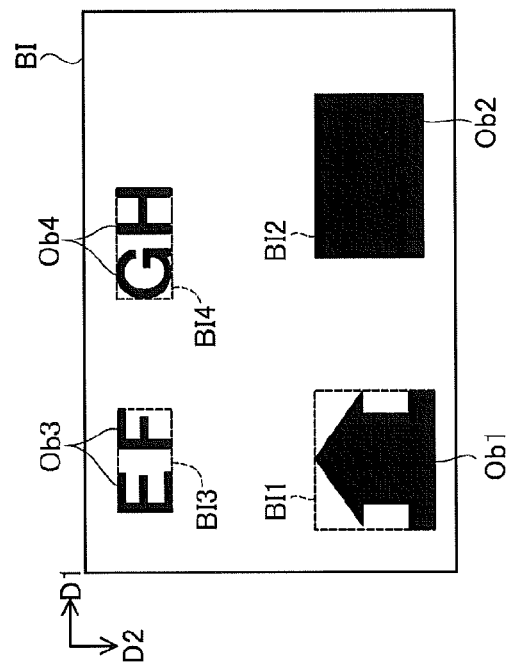
FIG. 3B is a schematic drawing of an edge image corresponding to the target image of FIG. 3A.

FIGS. 3A-3C include explanatory diagrams for describing a region identification process (steps S15-S25 in FIG. 2) and an object identification process (steps S30-S40 in FIG. 2). A target image SI in FIG. 3A is an example of an image rendered by target image data, such as scan data. The target image SI is configured of a plurality of pixels (not shown) arranged in a matrix that has a first direction D1, and a second direction D2 orthogonal to the first direction D1. Color values for a single pixel in the target image SI are RGB values that include gradation values for the three components red (R), green (G), and blue (B) (hereinafter referred to as "component values"). In the embodiment, each component value is one of 256 levels.

In the example of FIG. 3A, the target image SI includes a background Bg, a drawing DR, a photo PT, and four characters TX1-TX4. A drawing includes an illustration, table, graph, diagram, vector art, pattern, and the like. The four characters TX1-TX4 are monochromatic objects that are essentially represented by a single color. A monochromatic object is an object that is perceived to be rendered in one color by a typical observer, such as the user of the scanner 300 or multifunction peripheral 400 observing an object in the target image SI. A monochromatic image does not signify that each of the plurality of pixels constituting the object has the same RGB values. A photo PT is generally not a monochromatic object. A drawing DR may be a monochromatic object, but in most cases is not.

In S15 of FIG. 2, the region-identifying unit 110 (see FIG. 1) creates edge image data from the target image data and stores the edge image data in the buffer region 221. FIG. 3B is a schematic drawing of an edge image EI represented by the edge image data.

Figures 4, 5:
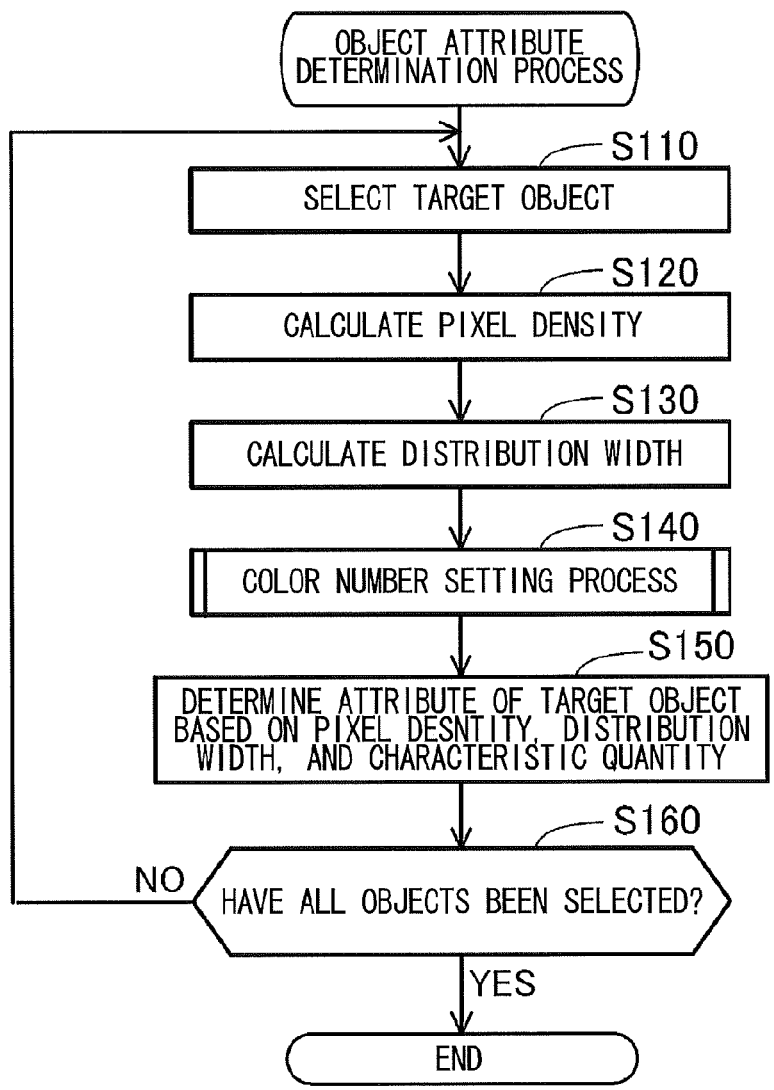
FIG. 4 shows an equation for calculating edge strength.
FIG. 5 is a flowchart illustrating steps in an object attribute determination process.

The edge image EI renders the edge strength for each pixel position in the target image SI. Edge strength represents the magnitude of change in gradation values in response to change in position within the image, i.e., the difference in gradation value among a plurality of neighboring pixels. The magnitude of change in gradation value with respect to changes in position in the image may be represented by a differential, for example. FIG. 4 shows an equation for calculating edge strength used in the embodiment. In this example, the region-identifying unit 110 uses the Sobel operator to calculate an edge strength Se for each of the three RGB color components.

$P(x, y)$ in FIG. 4 represents the gradation value for a specific pixel position $(x, y)$ in the target image SI. The coordinate x indicates the pixel position in the first direction D1, while the coordinate y indicates the pixel position in the second direction D2. As shown in this equation, the region-identifying unit 110 calculates the edge strength $Se(x, y)$ for pixel position $(x, y)$ in the target image SI using a 3×3 block of adjacent cells (i.e., nine pixels) centered on pixel position $(x, y)$. The first and second operators in the equation of FIG. 4 are each the absolute value of the sum of products obtained by multiplying the gradation values of the nine pixels by corresponding coefficients. The first operator represents the differential of gradation values in the first direction D1 (i.e., the horizontal differential), while the second operator represents the differential of gradation values in the second direction D2 (i.e., the vertical differential).

In FIG. 3B, the positions of pixels having a relatively high edge strength (hereinafter referred to as edge pixels) are depicted by chain lines that represent edges Eg1-Eg6. Thus, the edge image EI in FIG. 3B includes a plurality of edges Eg1-Eg6 respectively corresponding to the drawing DR, photo PT, and characters TX1-TX4 in the target image SI.

After generating the edge image data, in S20 the region-identifying unit 110 sets a plurality of blocks BL over the edge image EI, where each block BL includes a plurality of pixels. The blocks BL are arranged in a matrix over the edge image EI, as indicated by dashed lines in FIG. 3B. A single block BL is configured of a block of pixels PX arranged in BLn rows×BLn columns, for example (where BLn is an integer of 2 or greater). The value of BLn may be any value within the range 10-50, preferably. Since the edge image EI and the target image SI are identical in size (have the same number of pixels, both vertically and horizontally), it can be said that the blocks BL are set over the target image SI.

In S25 the region-identifying unit 110 identifies solid regions and non-solid regions in units of blocks BL. Solid regions have smaller edge strengths than prescribed reference values, while non-solid regions have edge strengths greater than or equal to the prescribed reference values. More specifically, in S25 the region-identifying unit 110 calculates average edge strengths ERave, EGave, and EBave for each block BL. The average edge strengths ERave, EGave, and EBave are calculated for the three color components red, green, and blue, respectively. The region-identifying unit 110 compares the average edge strengths in the block BL being processed with the prescribed reference values to classify the current block BL as a solid block or a non-solid block. A smaller block has smaller average edge strengths than the corresponding reference values, while a non-solid block has average edge strengths greater than or equal to the reference values. In the embodiment, the region-identifying unit 110 compares the average edge strengths ERave, EGave, and EBave to reference values ETr, ETg, and ETb preset for corresponding color components. If ERave<ETr, EGave<ETg, and EBave<ETb, the region-identifying unit 110 classifies the target block BL as a solid block. Conversely, if even one of the expressions ERave ETr, EGave ETg, and EBave≥ETb is satisfied, then the region-identifying unit 110 classifies the target block BL as a non-solid block.

In the edge image EI of FIG. 3B, non-solid blocks are shaded, while solid blocks are not. After classifying all blocks BL as either solid blocks or non-solid blocks, the region-identifying unit 110 consolidates each group of one or more contiguous non-solid blocks into a single region and identifies the region as a single non-solid region. Similarly, the region-identifying unit 110 consolidates each group of one or more contiguous solid blocks into a single region and identifies the region as a single solid region. Since one or more contiguous non-solid blocks are incorporated into a single non-solid region as described above, non-solid regions are normally surrounded by solid regions and outer edges of the edge image EI.

In the example of FIG. 3B, the region-identifying unit 110 identifies two non-solid regions L11 and L12 corresponding to the drawing DR and the photo PT in the target image SI (FIG. 3A). The region-identifying unit 110 also identifies a single non-solid region L13 corresponding to the two characters TX1 and TX2 in the target image SI, and a single non-solid region L14 corresponding to the two characters TX3 and TX4. The region-identifying unit 110 also identifies a single solid region L10 corresponding to the background Bg in the target image SI. Here, identifying solid regions and non-solid regions in the edge image EI is synonymous with identifying solid regions and non-solid regions in the target image SI. A non-solid region is an example of an object region, while a solid region is an example of a peripheral region positioned around an object region.

In S30 the object-identifying unit 120 sets reference values for each of the non-solid regions L11-L14 for thresholding the corresponding non-solid regions in the target image SI (hereinafter referred to as "thresholding reference values") using color values of pixels in the solid region surrounding the non-solid region. In the embodiment, a thresholding reference value is set for each of the RGB components. More specifically, average values Rr, Gr, and Br of the RGB component values for all pixels in the solid region surrounding the non-solid region are used as the thresholding reference values. Since all of the non-solid regions L11-L14 in the example of FIG. 3B are surrounded by the single solid region L10 corresponding to the background Bg, all of the non-solid regions L11-L14 have the same thresholding reference values, i.e., the average values of the color components values in the solid region L10.

In S35 the object-identifying unit 120 uses the thresholding reference values, such as average values Rr, Gr, and Br to generate binary image data for each of the non-solid regions L11-L14. In the embodiment, the object-identifying unit 120 executes a thresholding process using six threshold values R1, R2, G1, G2, B1, and B2 calculated based on these thresholding reference values Rr, Gr, and Br.

Lower limit threshold value $R1$ for red=$Rr-dV$, upper limit threshold value $R2$ for red=$Rr+dV$ Lower limit threshold value $G1$ for green=$Gr-dV$, upper limit threshold value $G2$ for green=$Gr+dV$ Lower limit threshold value $B1$ for blue=$Br-dV$, upper limit threshold value $B2$ for blue=$Br+dV$ Here, dV is a predetermined value, and the values R1, R2, G1, G2, B1, and B2 define ranges of colors near the average colors of the solid region surrounding the target non-solid region, i.e., ranges of colors relatively near the background color.

The object-identifying unit 120 generates binary image data for a non-solid region in the target image SI by classifying each pixel in the non-solid region as an object pixel or a background pixel using the six threshold values R1, R2, G1, G2, B1, and B2. In other words, the object-identifying unit 10 identifies object pixels and background pixels included in the target image SI. Specifically, the object-identifying unit 120 classifies a pixel Pxi in the non-solid region as a background pixel when the gradation values of the pixel Pxi, that is, gradation values Ri, Gi, and Bi for the color components red, green, and blue, satisfy all three conditions below. The object-identifying unit 120 classifies the pixel Pxi as an object pixel when any one of the following three conditions is not satisfied.

$R1<Ri<R2$            First condition:

$G1<Gi<G2$            Second condition:

$B1<Bi<B2$            Third condition:

By calculating the background color using the colors of pixels in the solid region and classifying pixels relatively near this background color as background pixels while classifying all other pixels as object pixels, the object-identifying unit 120 can generate binary image data that accurately identifies object pixels constituting an object. For example, the object-identifying unit 120 generates binary image data by setting the pixel value of pixels classified as object pixels to "1" and setting the pixel value of pixels classified as background pixels to "0". FIG. 3C shows a binary image BI for the target image SI in FIG. 3A. While a single binary image BI is shown in FIG. 3C, in reality separate binary image data is generated for each of the non-solid regions L11-L14 described above.

After generating the binary image data, in S40 the object-identifying unit 120 uses this data to identify objects and background, and performs a labeling process to apply identifiers to identify objects and background. Specifically, the object-identifying unit 120 identifies a single region configured of a plurality of object pixels within one non-solid region as a single object. The object-identifying unit 120 also identifies a single region configured of one or more contiguous background pixels as a single background. Through the labeling process, the object-identifying unit 120 generates label data that correlates the identified objects and background with identifiers that identify these elements, for example, and stores this data in the buffer region 221. In addition, the object-identifying unit 120 correlates partial binary image data with the identifier identifying an object and stores this correlated data in the buffer region 221. Here, partial binary image data represents a partial binary image corresponding to the minimum bounding rectangle enclosing the object.

In the example of FIG. 3C, the object-identifying unit 120 has identified in the binary image BI an object Ob1 corresponding to the drawing DR, an object Ob2 corresponding to the photo PT, an object Ob3 corresponding to the two characters TX1 and TX2, and an object Ob4 corresponding to the two characters TX3 and TX4. Therefore, partial binary image data representing partial binary images BI1-BI4 corresponding to minimum bounding rectangles about the objects Ob1-Ob4 is stored in the buffer region 221. Since each pixel constituting the binary image BI corresponds to a pixel constituting the target image SI, identifying the objects Ob1-Ob4 in the binary image BI is synonymous to identifying objects in the target image SI corresponding to the objects Ob1-Ob4, i.e., the positions of the drawing DR, photo PT, and characters TX3 and TX4. Further, the color values of an object pixel in the following description will be used to denote the RGB values or the like or a pixel in the target image SI corresponding to an object pixel identified by binary image data.

In S50 the image process unit 100 executes an object attribute determination process to determine whether each object identified in the target image SI is a text object.

FIG. 5 is a flowchart illustrating steps in the object attribute determination process. In S110 of FIG. 5, the image process unit 100 selects an object to be processed from among the identified objects Ob1-Ob4 (hereinafter called the "target object").

In S120 the image process unit 100 calculates a pixel density S for the target object and stores the pixel density S in the buffer region 221. The pixel density S denotes the number of object pixels constituting the target object among the total number of pixels in the partial binary image representing the target object. Using the example of the object Ob3, the pixel density S is the number of object pixels constituting the object Ob3 to the total number of pixels in the partial binary image BI3 (see FIG. 3C) representing the object Ob3. Hence, the pixel density S denotes the number of object pixels per unit area. Here, the total number of pixels in the partial binary image can be rephrased as the total number of pixels in the minimum bounding rectangle enclosing the target object.

Figure 6:
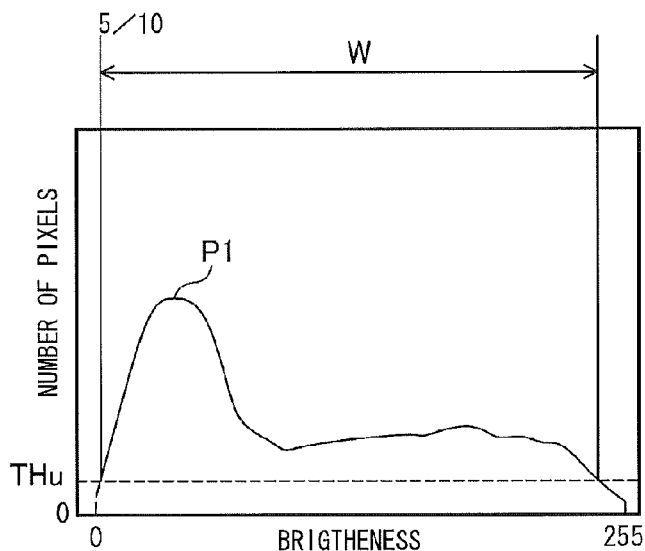
FIG. 6 shows an example of a histogram representing a brightness distribution of a target object.

In S130 the image process unit 100 calculates a distribution width W for colors in the target object and stores this distribution width W in the buffer region 221. FIG. 6 shows an example of a histogram representing the brightness distribution of a target object. The image process unit 100 first generates histogram data representing a brightness histogram, such as that shown in FIG. 6. This histogram data is obtained by sorting each of the object pixels in the target object into one of a plurality of classes corresponding to the brightness of the object pixel. In the embodiment, the image process unit 100 generates histogram data by calculating 256 levels of brightness values based on the color values of all object pixels and setting each brightness level as one class. For example, a brightness value for each object pixel may be found using an equation for calculating the Y component, serving as the brightness component in the YCbCr color space, from the RGB component values. As shown in FIG. 6, the image process unit 100 calculates, as the color distribution width W, the difference (width) between the minimum and maximum brightness values for which the pixel count exceeds a prescribed threshold Thu.

In S140 the image process unit 100 executes a color number setting process for calculating a characteristic quantity C representing the number of colors in the target object.

Figure 7:
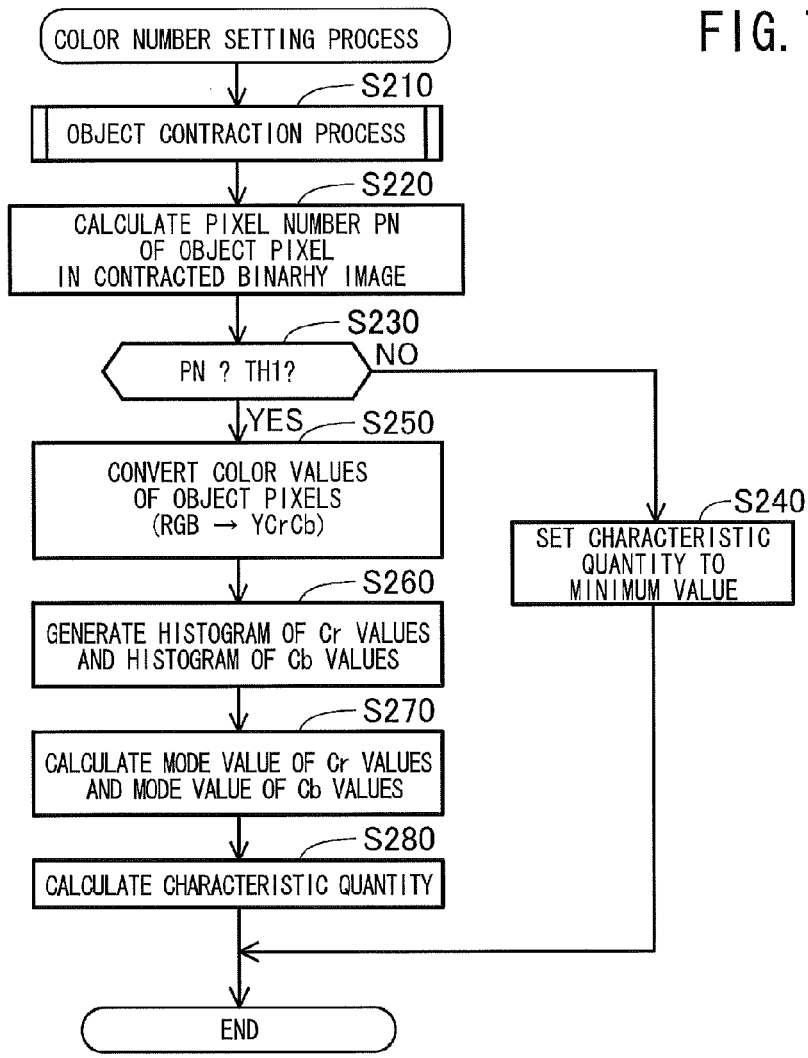
FIG. 7 is a flowchart illustrating steps in a color number setting process.

FIG. 7 is a flowchart illustrating steps in the color number setting process. In S210 of FIG. 7, the image process unit 100 executes an object contraction process for contracting each target object in the binary image BI. The object contraction process contracts each of the pluralities of object pixels in the binary image BI, that is, each of the objects Ob1-Ob4 (see FIG. 3C) configured of pixels with the pixel value "1". The object contraction process does not effect any changes in the drawing DR, photo PT, and characters TX1-TX4 in the target image SI (see FIG. 3A). The contraction of objects in the binary image BI is implemented by changing a plurality of object pixels constituting the target object to background pixels.

Figure 9A:
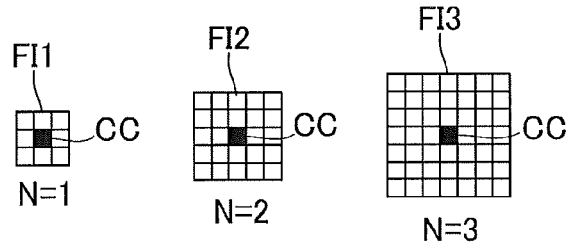
FIGS. 9A-9C are explanatory diagrams illustrating the object contraction process.
Figure 9B:
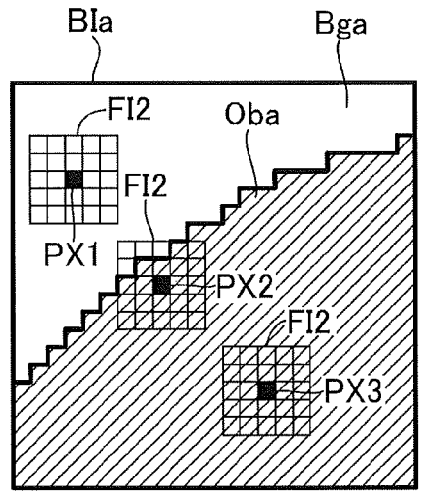
Figure 9C:
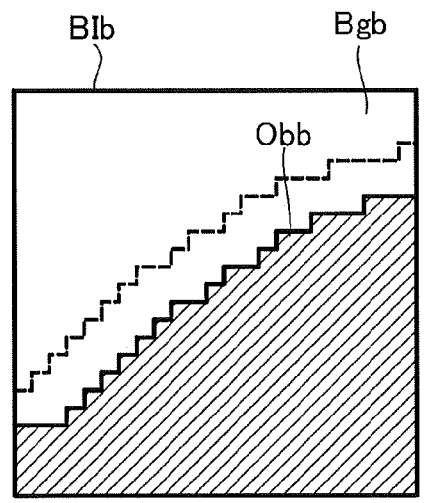

FIG. 8 is a flowchart illustrating steps in the object contraction process. FIGS. 9A-9C are explanatory diagrams illustrating the object contraction process. In S310 of FIG. 8, the modifying unit 130 sets the size of a filter to be used for contracting an object based on the resolution of the target image data. A filter width FW represents the horizontal and vertical dimensions of the filter and is expressed by the equation FW=2N+1 (where the variable N is a natural number). FIG. 9A shows three example of filters FI1-FI3 corresponding to N=1 (FW=3), N=2 (FW=5), and N=3 (FW=7). The variable N controls the degree to which the object is contracted. Hence, the object is contracted to a larger degree for larger values of the variable N.

In the embodiment, the variable N is set to a larger value for lower scanning resolutions set when the scan data is generated by the scanner 300 or multifunction peripheral 400 scanning an original. For example, if the scanning resolution is 300 dpi, the variable N is set to "3" in the embodiment. If the scanning resolution is 600 dpi, the variable N is set to "1". The rationale for these settings will be described later.

In S320 the modifying unit 130 prepares initial data in the buffer region 221 for contracted binary image data representing a contracted binary image. The initial data is binary image data representing a region having the same size as the partial binary image representing the target object. All pixel values in the initial data may be set to an initial value of "0", for example.

In S330 the modifying unit 130 selects one of the plurality of pixels in the partial binary image representing the target object as a target pixel.

In S340 the modifying unit 130 determines whether a background pixel falls within the range of the filter when a center position CC (see FIG. 9A) of the filter overlaps the target pixel. Hereinafter, this range will be called the "target range."

FIG. 9B shows a portion of an image BIa serving as a partial binary image representing the target object. The partial binary image BIa includes an object Oba configured of a plurality of object pixels, and a background Bga configured of a plurality of background pixels. In FIG. 9B, the object Oba is shaded while the background Bga is not. In the example of FIG. 9B, the filter FI2 (shown in FIG. 9A) configured of a 5×5 block of pixels is applied to the partial binary image BIa. When a background pixel, such as background pixel PX1 in the example of FIG. 9B, is selected as the target pixel, the modifying unit 130 determines that a background pixel falls within the target range without referencing any peripheral pixels around the target pixel. When an object pixel, such as object pixel PX2 shown in FIG. 9B, is selected as the target pixel, the modifying unit 130 determines that a background pixel falls within the target range because at least one background pixel is present in the target range. In other words, the modifying unit 130 changes a target pixel to a background pixel if the target pixel is an object pixel. If a pixel, such as object pixel PX3 in the example of FIG. 9B, is selected as the target pixel, the modifying unit 130 determines that no background pixel falls within the target range since not even one background pixel is present in the target range.

If the modifying unit 130 determines that a background pixel is present in the target range (S340: YES), in S350 the modifying unit 130 sets the pixel in the contracted binary image corresponding to the target pixel (hereinafter referred to as the "corresponding pixel") to a background pixel. In other words, the modifying unit 130 leaves the value of the corresponding pixel at "0". However, if the modifying unit 130 determines that a background pixel does not exist in the target range (S40: NO), in S360 the modifying unit 130 sets the corresponding pixel in the contracted binary image to an object pixel. Here, the modifying unit 130 changes the value of the corresponding pixel from "0" to "1". In this manner, the modifying unit 130 changes, to a background pixel, an object pixel that is included in the target range and is adjacent to a background pixel if the target range includes at least one object pixel and at least one background pixel. Accordingly, the plurality of object pixels in the target image is classified into the background pixel (a changed object pixel) or the object pixel.

After the corresponding pixel in the contracted binary image has been set to either an object pixel or a background pixel, in S370 the modifying unit 130 determines whether all pixels in the partial binary image representing the target object have been selected as the target pixel. When there remain pixels that have not been selected as the target pixel (S370: NO), the modifying unit 130 returns to S330, selects an unprocessed pixel, and repeats the process in S340-S360. Once all pixels have been selected as the target pixel (S370: YES), the modifying unit 130 ends the object contraction process. Through this object contraction process, the contracted binary image is changed from its initial data in which all pixels are initialized to a value of "0" to modified data in which all pixels are set to either "0" or "1".

FIG. 9C shows a contracted binary image BIb corresponding to the partial binary image BIa in FIG. 9B. The contracted binary image BIb includes an object Obb configured of a plurality of object pixels, and a background Bgb configured of a plurality of background pixels. In FIG. 9C, the object Obb is shaded, while the background Bgb is not. The dashed line in FIG. 9C indicates the outer edge of the original object Oba in the partial binary image BIa of FIG. 9B. As shown in FIG. 9C, the object Obb of the contracted binary image BIb has been contracted a distance equivalent to two pixels from the object Oba in the partial binary image BIa. Since the filter FI2 of FIG. 9A used in the example of FIGS. 9B and 9C is defined by a variable N=2, the variable N not only defines the filter size, but also represents the amount of contraction in units of pixels.

FIGS. 10A-10C are explanatory diagrams showing contracted binary images. FIGS. 10A-10C each show one of three objects in the target image SI, and specifically the character TX3, drawing DR, and photo PT, respectively. Outer edges OE1-OE3 of the character TX3, drawing DR, and photo PT, respectively, have been shaded in FIG. 10. The outside line of each of the outer edges OE1-OE3 defines the region corresponding to the object in the binary image prior to the contraction process, while the inside line of each of the outer edges OE1-OE3 defines a region corresponding to the object in the contracted binary image. In other words, the object pixels in the binary image corresponding to the outer edges OE1-OE3 in FIGS. 10A-10C are changed to background pixels in the object contraction process, and specifically the values of these pixels are changed from "1" to "0".

Since the target image data is scan data, blurring occurs at the outer edges OE1-OE3 of objects in the target image SI, i.e., at the bordering regions between objects and the background. That is, a scanner produces scan data by moving the position of an image sensor relative to an original in a sub-scanning direction while the image sensor receives light from the original. During this process, pixel data for the outer edges of the object is produced based on both light received from the object and light received from the background. Consequently, various colors are received for the outer edges based on the color of the object in the original and the color of the background, resulting in blurring. For example, if the color of the object is dark red while the color of the background is white, the color of the outer edge of the object may include light red and pink colors. Thus, the contracted binary images are generated in the embodiment in order to identify objects in the target image SI after removing their blurred outer edges. Therefore, the degree to which an object is contracted in the object contraction process, that is, the width or thickness of the outer edge being removed is preferably larger when the blurring produced in the target image SI is stronger.

In 5310 of the object contraction process described above, the value of the variable N indicating the filter size is increased for lower scanning resolutions, since more blurring tends to occur in the target image SI at lower scanning resolutions. As a result, it is possible to produce contracted binary image in which object pixels have been suitably converted to background pixels according to the scanning resolution.

Returning to the description in FIG. 7, after completing the object contraction process of S210, in S220 the setting unit 140 calculates a pixel number PN of object pixels in the contracted binary image that constitute the target object. In S230 the setting unit 140 determines whether the pixel number PN of object pixels is greater than or equal to a threshold value TH1. Hereinafter, object pixels in a contracted binary image that constitute the target object (i.e., pixels constituting the target object that are left after removing object pixels in the outer edge of the target object from the binary image during the contraction process) will be called post-contraction object pixels.

If the pixel number PN of post-contraction object pixels exceeds the threshold value TH1 (S230: YES), in S250 the converting unit 150 converts the color values of the PN object pixels to values in the YCbCr color space.

In S260 the setting unit 140 generates histogram data representing histograms of Cr values and Cb values, and stores this histogram data in the buffer region 221. This histogram data is generated by sorting each of the post-contraction object pixels into one of a plurality of classes based on their Cr values. In the embodiment, one class is established for each of 256 Cr values. The process is identical for the Cb values. FIG. 11 shows a sample histogram HG1 of Cr values. The histogram HG1 in FIG. 11 is for a monochromatic object, such as text. Therefore, the frequencies (pixel counts) of Cr values in the histogram HG1 are concentrated in a relatively small range within the possible range of Cr and Cb values. In contrast, frequency values in a histogram representing an object that is not monochromatic, such as a color photo, are distributed across a relatively wide range within the possible range of Cr and Cb values, as in the histogram of FIG. 6.

In S270 the setting unit 140 calculates a mode Crm of Cr values and a mode Cbm of Cb values using the histogram data generated in S260. FIG. 11 shows the mode Crm of Cr values.

In S280 the setting unit 140 calculates the characteristic quantity C representing the number of colors in the target object and stores the characteristic quantity C in the buffer region 221. The setting unit 140 accomplishes this by first calculating a characteristic quantity C_cr based on the Cr values, and a characteristic quantity C_Cb based on the Cb values. The characteristic quantity C_cr is expressed by (PNa+PNb)/PNtotal. Here, PNa and PNb denote the number of object pixels respectively belonging to regions CAa and CAb that have been shaded in the histogram of FIG. 11. The regions CAa and CAb fall outside a prescribed range centered on the mode Crm of Cr values {(Crm−TH2)<Cr<(Crm+TH2)}. Here, TH2 is a predetermined reference value. In other words, PNa denotes the number of object pixels having Cr values less than or equal to (Crm−TH2), and PNb denotes the number of object pixels having Cr values greater than or equal to (Crm+TH2). PNtotal denotes the total number of post-contraction object pixels. From the above description, it should be clear that the characteristic quantity C_cr based on Cr values is a ratio of object pixels in a prescribed range to the total number of post-contraction object pixels.

Similarly, the characteristic quantity C_Cb based on Cb values is expressed as (PNc+PNd)/PNtotal. Here, PNc denotes the number of object pixels having Cb values less than or equal to (Cbm−TH2), and PNd denotes the number of object pixels having Cb values greater than or equal to (Cbm+TH2).

The setting unit 140 determines the characteristic quantity C for the number of colors in the object by taking the average value of the characteristic quantity C_cr based on Cr values and the characteristic quantity C_Cb based on Cb values.

As shown in FIG. 11, the TH2 is preset to a value designed to restrict the prescribed range {(Crm−TH2)<Cr<(Crm+TH2)} to a range of Cr values that is sufficiently narrow to consider an object monochromatic. The characteristic quantity C for the number of colors is relatively small when the target object is monochromatic and increasingly larger as the number of colors in the target object increases. The setting unit 140 ends the color number setting process after calculating the characteristic quantity C for the target object in S280.

However, if the pixel number PN of post-contraction object pixels is less than the TH1 (S230: NO), in S240 the setting unit 140 sets the characteristic quantity C for the target object to a minimum value and stores the characteristic quantity C in the buffer region 221. In the embodiment, the minimum value is "0".

Since the ratio of the outer edge of an object to the surface area of the object is relatively small when the target object is not text, such as when the target object is the drawing DR in FIG. 10B or the photo PT in FIG. 10C, it is unlikely that the pixel number PN of post-contraction object pixels is less than the threshold value TH1. However, the ratio of the outer edge of an object to its surface area is relatively high when the target object is text, such as the character TX3 in FIG. 10A. The outer edge to surface area ratio of an object is particularly large when the character is relatively small or relatively thin. In some cases, there may be almost no object pixels remaining after contraction. In such situations, it may not be possible to set a suitable characteristic quantity C using the number of colors in the post-contraction object pixels. Further, when object pixels are nearly eliminated through contraction, it is highly likely that the target object is composed of relatively thin lines or that the target object is text, and hence the target object is most likely monochromatic. For this reason, the setting unit 140 in the embodiment sets the characteristic quantity C for the number of colors to the minimum value when the pixel number PN of post-contraction object pixels is less than the threshold value TH1, regardless of the number of colors in the object pixels. This enables the setting unit 140 to set a suitable characteristic quantity C when the pixel number PN of post-contraction object pixels is unduly small. Note that after the setting unit 140 sets the characteristic quantity C for the target object in S240, the setting unit 140 ends the color number setting process.

Returning to FIG. 5, after the image process unit 100 completes the color number setting process of S140, in S150 the determining unit 160 determines the attribute of the target object based on the distribution width W, and the characteristic quantity C denoting the number of colors. Specifically, the determining unit 160 determines whether or not the target object is a text. Generally, characters are rendered in single colors, while non-text, such as drawings and photos have a relatively large number of colors. For example, a photo expresses various colors of the photographed subject and, hence, has a relatively large number of colors. Further, text is generally depicted against the background in colored lines different from the background color. Consequently, text is unlikely to occupy the majority of pixels in the minimum bounding rectangle, making the pixel density S relatively small. Conversely, non-text has a relatively large pixel density S. For example, a photo likely occupies the majority of the minimum bounding rectangle and, hence, has a relatively high pixel density S. The determining unit 160 references the determination table 233 created with the above considerations in mind to determine whether the target object is text. The determining unit 160 associates the determination results with the identifier of the target object and stores this association in the buffer region 221.

FIG. 12 shows an example of the determination table 233. As is clear from the determination table 233, the determining unit 160 determines that the target object is text when either of the following determination conditions (1) or (2) is satisfied, and determines that the target object is not text (non-text) when neither determination condition is satisfied.

Distribution width $W \geq$ threshold value $W$th, characteristic quantity $C <$ threshold value $C$th, and pixel density $S <$ threshold value $S$th    (1)

Distribution width $W <$ threshold value $W$th, characteristic quantity $C <$ threshold value $C$th, and pixel density $S <$ threshold value $S$th    (2)

The threshold value Cth is set through experimentation to a value capable of indicating a target object is monochromatic when the characteristic quantity C of the target object is less than the threshold value Cth.

After judging whether the target object is text in S150, in S160 the image process unit 100 determines whether all identified objects have been selected as the target object. If there remain objects that have not been selected (S160: NO), the image process unit 100 returns to S110, selects an unprocessed object as the target object, and repeats the process in S120-S160 described above. When all objects have been selected (S160: NO), the image process unit 100 ends the object attribute determination process.

Returning to FIG. 2, after completing the object attribute determination process, in S55 the image process unit 100 generates background image data representing a background image GI (FIG. 13A), which is equivalent to the target image SI with text removed. Specifically, the image process unit 100 identifies pixels constituting text in the target image SI. The image process unit 100 identifies these pixels using the binary image data generated in S35 for identifying objects, and more particularly the binary image data representing the partial binary images BI3 and BI4 (see FIG. 3C) for objects identified as text. Next, the image process unit 100 changes the color values of the pixels constituting text in the target image SI to values representing the color of the background Bg in the target image SI. This process effectively eliminates text from the target image SI. The values representing the color of the background Bg were calculated in S30 as the thresholding reference values Rr, Gr, and Br.

Figure 13A:
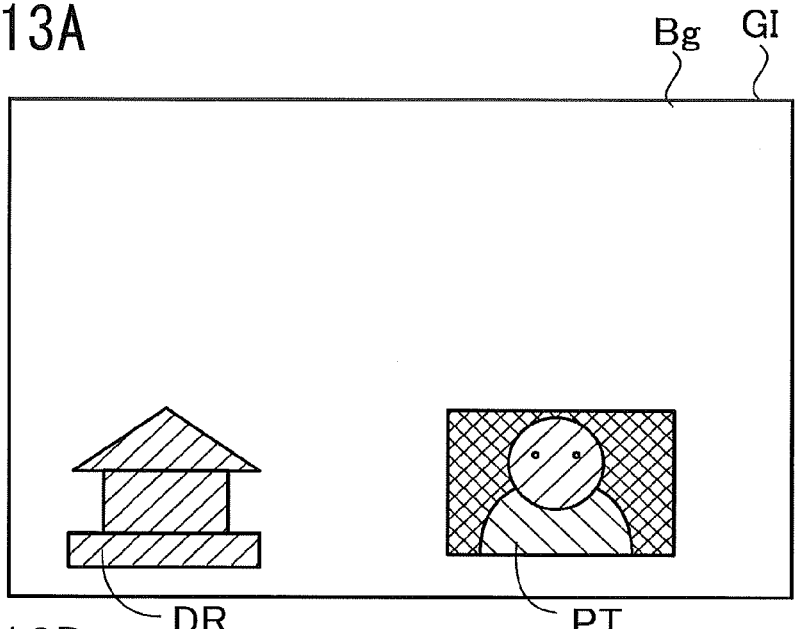
FIGS. 13A and 13B are explanatory diagrams illustrating how to create a high-compression PDF file.
Figure 13B:
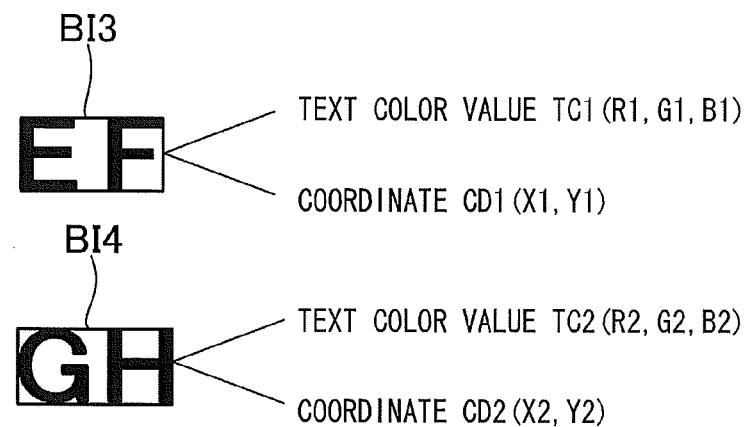

FIGS. 13A and 13B illustrate how to create a high-compression PDF file. FIG. 13A shows an example of the background image GI. The background image GI includes the drawing DR and photo PT of the target image SI in FIG. 3A, while excluding the characters TX1-TX4.

In S60 of FIG. 2, the image process unit 100 generates compressed text image data by compressing the binary image data representing text. Specifically, the image process unit 100 uses a lossless compression method, such as Flate compression, to compress the binary image data representing the partial binary images BI3 and BI4 for objects determined to be text in the target image SI. The image process unit 100 stores the compressed text image data in the buffer region 221.

In S65 the image process unit 100 generates compressed background image data by compressing the background image data generated in S55. Here, the image process unit 100 uses a lossy compression method, such as JPEG compression, on the background image data. The image process unit 100 stores the compressed background image data in the buffer region 221.

In S70 the image process unit 100 generates a compressed PDF file from the separate compressed image data sets generated above. Specifically, the image process unit 100 stores the compressed background image data generated in S65 in a PDF file to be displayed as the bottommost layer. Next, the image process unit 100 stores the compressed text image data generated in S60 in the PDF file to be displayed in a layer above the compressed background image data. The compressed text image data is stored in the PDF file in association with a text color TC and coordinates CD. The text color TC is configured of RGB values representing the color of the text. For example, the text color TC may be the average RGB values for all pixels configuring text in the target image SI. The coordinates CD are configured of data representing the desired position of the partial binary image represented by the compressed text image data. For example, the coordinates CD may be expressed by coordinate values (X, Y) for the upper left pixel in the partial binary image. In the example of FIG. 13B, the text color TC1 (R1, G1, B1) and the coordinates CD1 (X1, Y1) are associated with the compressed text image data representing the partial binary image BI3. Similarly, the text color TC2 (R2, G2, B2) and the coordinates CD2 (X2, Y2) are associated with the compressed text image data representing the partial binary image BI4.

After generating the compressed PDF file, the image process unit 100 stores the file in the nonvolatile storage device 230, for example, and deletes the various intermediate data stored in the buffer region 221 before ending the image process.

PDF files allow image data of varying formats to be stored in a single file. Specifications indicate how the various image data sets stored in the PDF file are to be arranged and overlapped in order to reproduce the file as a single image when displaying the image. In S70 the image process unit 100 stores each compressed image data set in the PDF file according to the PDF standards so that the target image SI (see FIG. 3A) can be reproduced using a browser program for displaying the compressed PDF file created according to the embodiment.

In the image process according to the embodiment described above, the modifying unit 130 executes the object contraction process described in FIG. 8 to generate a contracted binary image. In this process, the modifying unit 130 converts object pixels in the outer edges of objects belonging to the pre-contracted binary image to background pixels. Subsequently, the setting unit 140 executes the color number setting process of FIG. 7 to set a characteristic quantity C representing the number of colors in an object using the color values for post-contraction object pixels. This method enables the image process unit 100 to set an appropriate characteristic quantity C related to the number of colors in an object. Hence, the computer 200 can appropriately determine whether an object is text.

If the computer 200 were to calculate the characteristic quantity C based on object pixels in the binary image prior to contraction, without performing the contraction process, the characteristic quantity C would be calculated using color values for pixels in the outer edge of the object. The dashed line in FIG. 11 shows a histogram HG2 calculated based on object pixels in a non-contracted binary image. As described above, the outer edge of an object can possess object pixels with various colors, even when the object is monochromatic. Consequently, the distribution of object pixels represented by the HG2 covers a relatively wide range within the range of possible Cr and Cb values, even though the object is monochromatic. Colors of object pixels in the outer edge of an object are changed due to the color of the surrounding background and properties of the scanner. Thus, when the characteristic quantity C is calculated using color values for object pixels in the outer edge of the object (see FIG. 10), it is difficult to set a single appropriate threshold value TH2 (see FIG. 11) used in calculating the characteristic quantity C and for the threshold value Cth (see FIG. 12) for determining whether the object is monochromatic based on the characteristic quantity C. This problem leads to difficulties in appropriately determining whether an object is monochromatic, and further in appropriately determining whether an object is text.

Further, by using a filter (see FIG. 9A) in the object contraction process described above, the image process unit 100 can appropriately determine which object pixels should be changed to background pixels based on object pixels and background pixels present in the target range (specifically, the range covered by the filter). This method is performed on all objects, regardless of type. Accordingly, the image process unit 100 can identify post-contraction object pixels after appropriate removal of the outer edge, even though it is not known whether the object is text, for example. Therefore, the image process unit 100 can suitably determine the number of colors in a variety of objects, without determining the attributes of the objects in advance.

In the object contraction process according to the embodiment described above, the modifying unit 130 generates a contracted binary image by setting the pixel in the contracted binary image that corresponds to a target pixel in the pre-contracted binary image to a background pixel (S350 of FIG. 8) when the target pixel is an object pixel and a background pixel falls within the range of the filter (S340: YES). In other words, the contracted binary image is generated by converting object pixels selected as target pixels from the pre-contracted binary image to background pixels. Thus, the computer 200 can suitable change object pixels to background pixels.

In the color number setting process according to the embodiment described above, the converting unit 150 converts the color values (RGB values) of object pixels to values in the YCbCr color space, and the setting unit 140 calculates the characteristic quantity C based on the resulting Cr and Cb values, without using the Y values (S250-S280 in FIG. 7). In an image represented by scan data, component values indicating color, such as Cr and Cb values, generally have more irregularity than component values indicating brightness, such as the Y value. Accordingly, the number of colors in an object can be more suitable determined using only component values specifying color. Here, the present invention is not limited to the Cr and Cb values for the YCbCr color space, but may employ the a* and b* values in the Lab color space or the S and V values in the HSV color space. Generally speaking, it is preferable to calculate the characteristic quantity C using second component values of a prescribed color space that includes a first component value specifying brightness, and second component values specifying color components.

C. Variations of the Embodiment (1) In the embodiment described above, scan data is used as the target image data, and the present invention can set a suitable characteristic quantity C for each object in the image without being affected by blurring in the image represented by the scan data. However, the present invention is not limited to the use of scan data as target image data. For example, the scan data may be compressed image data that has been compressed using a lossy compression technique, such as JPEG compression. Since the edges of objects can lose their sharpness when compressed according to the JPEG method, blurring often occurs in the outer edges of the compressed objects. Using the image process according to the embodiment, the computer 200 can suitably set a suitable characteristic quantity C for each object in the image without being influenced by blurring in the image represented by the compressed image data.

(2) The method of producing a contracted binary image according to the present invention is not limited to the example described in the object contraction process of the above-described embodiment. For example, when preparing the initial contracted binary image data in S320 of FIG. 8, the modifying unit 130 may set the value of all pixels in the data to "1", indicating an object pixel. In this case, the modifying unit 130 arranges a filter, such as that shown in FIG. 9A, over the pre-contracted binary image so that the center position CC of the filter (see FIG. 9A) overlaps the target pixel, as described in the embodiment. When the target pixel is a background pixel, the modifying unit 130 sets the value of all pixels in the contracted binary image corresponding to all pixels in the filter to "0", indicating a background pixel. When the target pixel is an object pixel, the modifying unit 130 does not change the value of pixels in the contracted binary image. The modifying unit 130 generates the contracted binary image data by executing the above process while selecting each pixel in the pre-contracted binary image to be the target pixel. As in the preferred embodiment, this method can produce contracted binary image representing an object whose outer edge has been contracted by N pixels when using a square filter having a filter width FW in both horizontal and vertical directions equivalent to 2N+1.

The modifying unit 130 can also produce contracted binary image representing an object whose outer edge has been contracted by N pixels when using a square filter having a filter width FW in both horizontal and vertical directions equivalent to N+1. In this case, the modifying unit 130 prepares the initial contracted binary image data in S320 of FIG. 8 by setting the value for all pixels to "1", indicating an object pixel, for example. Next, the modifying unit 130 arranges the square filter over the pre-contracted binary image such that the target pixel in the binary image is aligned with a prescribed position in the filter, such as the upper left corner. When even one background pixel falls within the filter, the modifying unit 130 sets the pixels in the contracted binary image that correspond to all pixels in the filter to a value of "0", indicating a background pixel. When all pixels in the filter are object pixels, the modifying unit 130 does not make any changes to pixel values in the contracted binary image. By executing this process repeatedly with each pixel in the pre-contracted binary image set as the target pixel, the modifying unit 130 can produce contracted binary image data.

(3) In the above-described embodiment, the image process unit 100 determines whether an object is monochromatic based on the characteristic quantity C related to the number of colors, but various determinations related to the number of colors are possible. For example, the image process unit 100 could determine whether an object has two colors or three colors. Further, one or a plurality of values may be used as the characteristic quantities related to the number of colors, depending on the details of the determination on number of colors. For example, the characteristic quantity related to the number of colors may be the number of peaks in the histogram (see FIG. 11) or the widths of peaks, for example.

(4) In the color number setting process according to the embodiment, the setting unit 140 sets the characteristic quantity C to the minimum value ("0", for example) in S240 of FIG. 7 when the pixel number PN of post-contraction object pixels is less than the threshold value TH1, but the characteristic quantity C may be set to a value other than the minimum value. The results of determining whether an object is text would not be different if the characteristic quantity C were set to a value smaller than the threshold value Cth (see FIG. 12).

(5) In the above-described embodiment, the value of variable N, i.e., the size of the filter, is increased as the scanning resolution of the original decreases. However, the size of the filter may be increased as the scanning resolution of the original increases, depending on the properties of the scanner and the like. For example, the size of the filter may be set to an N equivalent to SR/300 in order to set, regardless of scanning resolutions, the contracted width to the same actual length in the original. Here, SR indicates the scanning resolution in units of dpi.

(6) In the image process of the above-described embodiment, the converting unit 150 converts RGB values for object pixels to color values in the YCbCr color system in S250 of the color number setting process in FIG. 7 in order to calculate the characteristic quantity C related to number of colors after performing the object contraction process in S210. However, this color system conversion may be executed at a different timing and need not be performed after the object contraction process. For example, the converting unit 150 may convert color values of object pixels constituting the pre-contracted target object to color values in the YCbCr color system prior to performing the color number setting process, such as between the process to select the target object in the object attribute determination process (S110 of FIG. 5) and the process to calculate the pixel density S (S120). Alternatively, the converting unit 150 may convert color values of all pixels in the scan data to the YCbCr color system directly after acquiring the scan data in S10 of FIG. 2. In this case, the scan data converted to the YCbCr color space is used to generate the edge image data in S15 and to generate the binary image data in S35.

(7) Any image processor may implement the image-processing functions performed by the scanner driver 100 in the computer 200 of the embodiment, such as the multifunction peripheral 400, scanner 300, or a digital camera (not shown), provided that the image processor includes an image-reading unit for optically reading an object to generate image data representing that object. In such cases, the image processor may perform image processes (such as the process described in FIG. 2) on image data generated with its own image-reading unit.

In general, the image processor implementing the image processes (such as the process in FIG. 2) described in the preferred embodiment is not limited to the computer 200 and may be another type of device, such as a computer built into a printer, digital camera, scanner, or other image-related device; a common personal computer; or a server connected to a network. Alternatively, the functions required for implementing the image processes of the embodiment may be divided among a plurality of computers that can communicate with each other over a network so that, together, the computers can provided all necessary functions. In this case, the entire computer system corresponds to the image processor.

(8) Part of the configuration implemented in hardware in the embodiment described above may be replaced with software processes and, conversely, all or part of the configuration implemented in software may be replaced with a hardware configuration.

What is claimed is:

1. An image processing device comprising:
a processor configured to:
identify a plurality of first pixels and a plurality of second pixels included in a target image represented by target image data, the plurality of first pixels representing an object, the plurality of second pixels representing a background;
set, in the target image, a target range of pixels in which at least one first pixel and at least one second pixel are included;
change, to a second pixel, a first pixel that is included in the target range and is adjacent to the second pixel, thereby classifying the plurality of first pixels into at least one changed first pixel and remaining first pixels, the changed first pixel being a first pixel that has been changed to a second pixel, each of the remaining first pixels being a first pixel that has been unchanged; and
determine a characteristic quantity by using pixel values of the remaining first pixels, the characteristic quantity relating to a number of colors in the object.

2. The image processing device according to claim 1, wherein, in the changing, a target pixel disposed at a prescribed position within the target range is changed to a second pixel if the target pixel is identified as a first pixel.

3. The image processing device according to claim 1, wherein, in the determining of the characteristic quantity, a prescribed value is determined as the characteristic quantity regardless of the pixel values of the remaining first pixels if a total number of the remaining first pixels is less than a reference value; and
wherein, in the determining of the characteristic quantity, the characteristic quantity is determined by using the pixel values of the remaining first pixels if the total number of the remaining first pixels is greater than or equal to the reference value.

4. The image processing device according to claim 1, wherein the processor is further configured to determine whether or not the object is a-text by using the characteristic quantity.

5. The image processing device according to claim 1, wherein the target image data is scan data generated by reading an original, and
wherein a size of the target range of pixels is determined based on a resolution of the scan data set when the original is read.

6. The image processing device according to claim 1, wherein the processor is further configured to convert, into data represented by a specified color space, a pixel value of each of the remaining first pixels, the data represented by the specified color space including a first component value and a second component value, the first component value specifying a brightness, the second component value specifying color, and
wherein, in the determining of the characteristic quantity, the characteristic quantity is determined by using a plurality of second component values, each of the plurality of second components being included in the data into which the pixel value of each of the remaining first pixels is converted.

7. The image processing device according to claim 1, wherein the target image data is at least one of: data generated by reading an original; and data compressed by using a lossy compression.

8. The image processing device according to claim 1, wherein, in the identifying, the processor is configured to:
identify an object region and a peripheral region positioned around the object region included in the target image, the object region including at least one first pixel and at least one second pixel; and
identify a first pixel and a second pixel that are included within the object region by using pixel values of pixels that are included in the peripheral region.

9. A non-transitory computer readable storage medium storing computer-readable instructions executable by a computer, the instructions causing, when executed, the computer to:
identify a plurality of first pixels and a plurality of second pixels included in a target image represented by target image data, the plurality of first pixels representing an object, the plurality of second pixels representing a background;
set, in the target image, a target range of pixels in which at least one first pixel and at least one second pixel are included;
change, to a second pixel, a first pixel that is included in the target range and is adjacent to the second pixel, thereby classifying the plurality of first pixels into at least one changed first pixel and remaining first pixels, the changed first pixel being a first pixel that has been changed to a second pixel, each of the remaining first pixels being a first pixel that has been unchanged; and determine a characteristic quantity by using pixel values of the remaining first pixels, the characteristic quantity relating to a number of colors in the object.

* * * * *